Dec. 26, 1944.   A. JERI   2,365,705
METHOD OF APPLYING TEMPORARY PROTECTIVE COATINGS
Filed Feb. 26, 1941
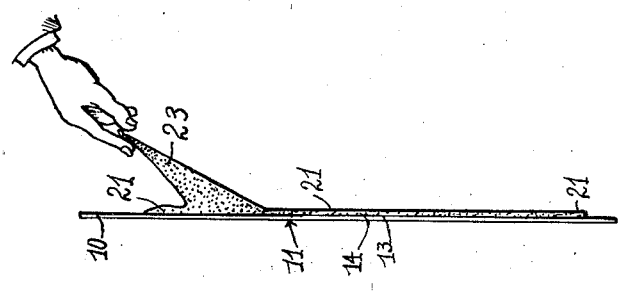
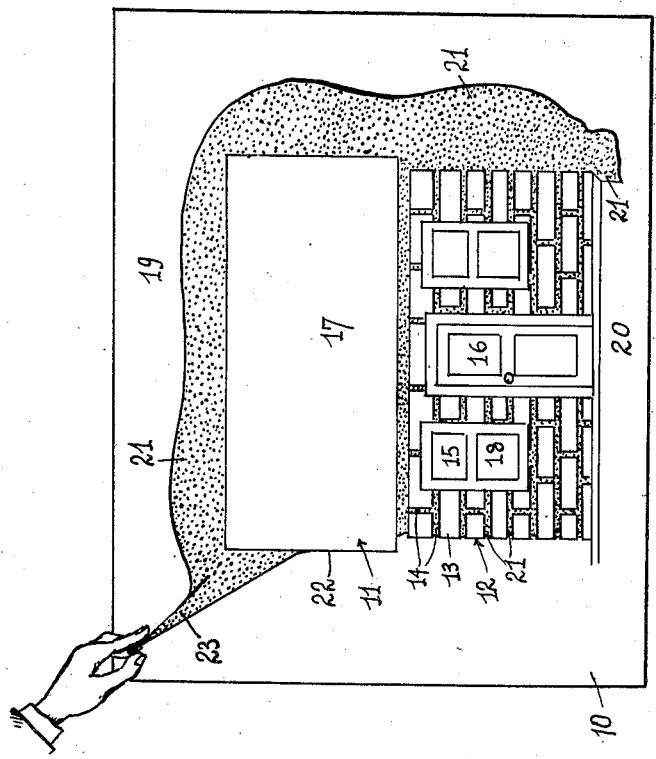
ANDREW JERI,
INVENTOR.
BY Julian J. Wittel,
his attorney.

Patented Dec. 26, 1944

2,365,705

UNITED STATES PATENT OFFICE 2,365,705

METHOD OF APPLYING TEMPORARY PROTECTIVE COATINGS

Andrew Jeri, Brooklyn, N. Y., assignor to Andrew Jeri Company, Inc., New York, N. Y., a corporation of New York Application February 26, 1941, Serial No. 380,631

2 Claims. (Cl. 117—6)

In drafting, architectural work, art work, photography, in decorative works and in many other cases, often it is necessary to cover a portion of the paper, canvas or other surface with a temporary protective layer, while certain operations are performed in the adjacent parts of the drawing, painting, etc., like changing the same, coloring it differently, or making a photo copy different from the one originally taken, eliminating the effect of a portion, and the like.

In such cases, it has already been proposed to cover such portions of the work by a layer which afterwards may be removed by erasure, scraping, and the like, but the application of such a layer is slow, cumbersome, inaccurate, and the removal thereof is still more so, and it almost always leaves the part of the drawing, painting, and the like, changed, the paper or canvas affected, and the colors covered by it altered.

The main object of my invention is to provide such a temporary protective layer on a portion of a drawing, painting, photograph, or other object, which may be easily removed by peeling or pulling it off from the surface to which it has been applied.

Another object of this invention is to provide a liquid or paste which may be easily applied by a brush, air brush, pen, ruling pen, etc., as necessary, to form such protecting covers, in some cases even in the form of thin lines.

Still a further object of this invention is to provide a liquid or paste of the mentioned character which will be fluid, or of heavier viscosity, as desired for the best application and removal, which will be quickly applied, and easily and quickly removed, and which will dry and form the protective layer or film in a pre-determined manner and time for the best results.

Still a further object of this invention is to provide a protective layer on paper, cloth, etc., for the mentioned purpose, which will have no effect on the surface on which it has been applied, will adhere to almost any kind of surfaces and will not affect water-proof colors or inks which have been protectively covered by it, so that the same may appear without any change after the protective layer or film has been peeled off.

Still further objects of this invention will be apparent as the specification of the same proceeds, and, among others, I may mention: to provide a liquid or paste for the mentioned purpose which will not have any unpleasant odor, which will not dry too quickly, neither too slowly, which will not deteriorate even after a long time, which will be of dark color, not transparent or translucent, so as to be easily observed, and to be of better aid in certain art and photographic operations, and which will not affect the appearance of the surface of paper, canvas and the like, and will not cause them to wrinkle after it has been removed.

While my invention mainly resides in a new process for doing certain operations in art, drawing, and photographic work, and in providing a specific composition of matter for the same, still a drawing accompanies this specification to aid in the descriptions and explanations thereof, and in said drawing:

Fig. 1 indicates a piece of paper, canvas, or the like, on which an architectural drawing is shown, a portion of which has been protected by my peelable film or layer, and Fig. 2 is an end view of said piece of paper indicating the starting of the peeling off operation.

In the drawing, the numeral 10 indicates a piece of paper or canvas, and 11 the architectural drawing showing the front of a simple building.

In this case, the walls 12 of the building show the usual brick effect 13, with spaces 14 therebetween. 15 indicates the windows, 16 the door, and 17 the roof.

Now, as an example of the application of my novel process, very often it is necessary to leave the spaces 14 between the bricks white, to show the bricks 13 red, to show the woodwork of the windows 15 and door 16 in some brownish or other desired color, to paint the window panes 18 into some bluish color, the roof 17 possibly red, and the sky 19 bluish, while showing the ground 20 in any desired color or design. Obviously, to do these various colorings in the exact parts and portions of the drawing requires slow careful work, and almost cannot be done with the neatness and exactness desired without protecting the parts not operated on.

With my process, if, for instance, the bricks 13 and the roof 17 are desired to be painted red, a protective film or layer 21 will be applied around the roof by a brush, and the outlines 22 of the roof may even be exactly followed first with a ruling pen having my liquid compound therein. Similarly the fine lines 14 between the bricks 13 which are intended to be left white, may be protected by a film or layer 21 of my liquid, in the narrower spaces again, applied by a ruling pen.

The protective films between the bricks and around the roof are shown only in a fragmentary manner in the drawing, as if some of them had been removed, and at 23 I indicate a portion thereof in the operation of peeling, and it will be understood that a portion 23 is grasped by the operator and the layer 21 peeled off the paper 10 in this manner. While the protective layers mentioned are on the drawing, the roof 17 and the bricks 13 may easily be painted red without the danger of affecting any of the adjacent surfaces. After peeling, the white between the bricks and possibly the blue of the sky around the roof 17 will be entirely unaffected by my protective layer.

It will be obvious that, in a similar manner, the other portions of the drawing may be protected while certain adjacent portions are operated on, and my process, and liquid or paste, may be similarly applied in many operations in photography, art work, decorations, textile designs, etc.

The preferred composition of matter to be used for my protecting peelable films or coats, and the preferred process for making the same, is as follows:

Taking the case of a certain amount of my composition of matter to be produced, I first take 32 ounces of a certain composition of matter manufactured by the Vultex Chemical Co., of Cambridge, Mass., and sold under the name of solution "F241–5," and which, to my information, is described in two United States patents to P. H. Shidrowitz, bearing the respective numbers and dates: 1,443,149, January 23, 1923, and 1,682,-857, September 4, 1928, for Rubber compositions and methods for manufacturing the same, and in another United States patent to H. B. Townsend for Method of concentrating aqueous rubber dispersions, No. 1,939,635, and dated December 12, 1933, and according to which said liquid contains in aqueous suspension vulcanized substantially uncoagulated rubber, which in certain cases may be made alkaline and may contain fillers, like pigments, fibrous material, etc., and from which, in other cases, undesirable protein and other foreign materials, water soluble matter, the resins natural in the original latex, and the excess of vulcanizing agents, and the side reaction products, substantially have been removed.

To the mentioned 32 ounces of said "F241–5" liquid I add, under constant stirring for about five minutes, one ounce of hydrogen peroxide, and then add, under constant stirring for ten minutes more, one ounce of pure carbon black (lamp black or bone black), until the resulting mixture is substantially uniform, whereupon 1½ ounces of glycerine is added under constant stirring for five minutes more.

The resulting solution is permitted to rest for about six hours, whereupon ¾ of an ounce of formaldehyde is added under vigorous stirring.

I may remark that I add the peroxide only when I desire to bleach the basic substances used, and, on the other hand, I may add to the described composition of my film or coat producing material, one or two drops of turpentine.

I also remark that lamp black, to my knowledge, is not needed for any of the actual use of my material, but I add it to the same to make it easily visible and observable when used for the said protective films or coats.

To my knowledge and observation, also, the small amount of glycerine prevents an undue speed in the drying of my material, while sometimes the very small amount of turpentine is needed to soften the rubber coating and to make it more flexible and easier to be removed by peeling.

Instead of the lamp black some other coloring material may be used, then care must be taken that the material should not stain the surface temporarily coated with my liquid or paste.

Instead of the peroxide, I sometimes successfully used a neutralized solution of potassium oxalate for bleaching the material of my solution. The formaldehyde, to my experience, is sometimes to be added to neutralize the ammonia used in the manufacture of my basic material, without affecting the rubber, and also to prevent a deterioration and bad odor in the material after a longer keeping of the same.

My material may be safely and efficiently used as a protective film or coat on paper surfaces, like in drawings, architectural work, on surfaces having photo emulsion coatings, on oil paintings, on water-proof inks, and, generally, on any surfaces and colors which will not be affected by, respectively are not soluble in, water.

I am aware of the fact that peelable protective coatings for food stuff, like eggs, fruit, and also for manufactured articles, like automobiles to be protected in transit, have been proposed, but to my knowledge and belief, no such temporary protective coatings have ever ben proposed or used, prior to my invention, for the mentioned type of operations in drawing, painting, decorating, photography, and other similar work.

I am also aware of the fact that changes and variations may be resorted to in the details of my process, and in the ingredients, and proportions thereof, used in making my novel composition of matter for the mentioned purpose, and I desire to reserve my possible rights to all such changes and variations which are within the spirit of this specification, and the scope of the claims hereunto appended.

Such changes, according to tests made by me, may consist in using ordinary rubber suspension or dispersion instead of the said specific material of the Vultex Chemical Co., or omitting certain of the ingredients in my composition, such changes still resulting in usable, peelable coating materials, while they are inferior to the ones described hereinbefore as my preferred compositions.

Another modification in my method, which I applied in certain cases, consisted in fixing water soluble colors with a thin solution of sodium silicate, or the like, which I sprayed on the water soluble colors before applying my peelable protective coating.

What I claim as new, is:

1. The process of preparing a drawing, including the steps of applying a temporary protective coating over those portions of the drawing not being worked on, performing desired operations on other parts of the drawing so that such operations should not affect the protected portions, said coating being peelable, and removing said coating by peeling after said operations on said other parts of the drawing are finished.

2. In a process, as set forth in claim 1, the added step of protecting lines in the drawing by preparing a liquid protector adapted to dry into a protective, peelable layer, and applying it by pen over the lines to be protected.

ANDREW JERI.